Patented Oct. 1, 1929

1,730,207

UNITED STATES PATENT OFFICE

WINFRID HENTRICH AND MAX HARDTMANN, OF WIESDORF-ON-THE-RHINE, GERMANY, ASSIGNORS TO GENERAL ANILINE WORKS, INC., OF NEW YORK, N. Y., A CORPORATION OF DELAWARE

NEW AZO DYESTUFFS

No Drawing. Application filed July 2, 1927, Serial No. 203,266, and in Germany July 16, 1926.

Our invention relates to new tetrakisazodyestuffs of the general formula:

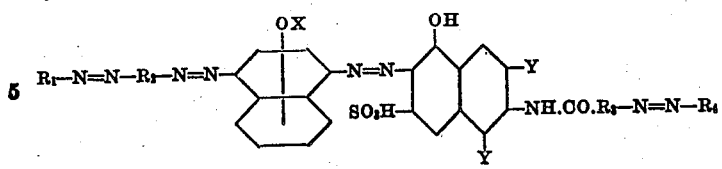

wherein $R_1$ and $R_3$ represent aromatic residues, $R_2$ represents a residue of the napththalene series, $R_4$ a residue of any suitable end component, X hydrogen, an alkyl or acidyl group, and Y hydrogen or any monovalent substituent.

They are obtainable, for instance, by diazotizing a disazo compound of the general formula:

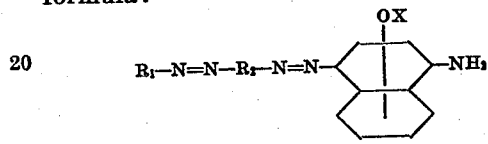

wherein $R_1$ represents an aromatic residue, $R_2$ a residue of the naphthalene series, and X hydrogen, an alkyl or acidyl group, coupling the diazo compound thus obtained with a compound of the general formula:

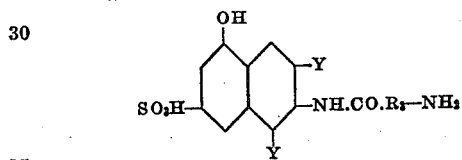

wherein $R_3$ represents an aromatic residue and Y hydrogen or a monovalent substituent, diazotizing again, and coupling with any suitable end component.

For the end component one may use for instance salicylic acid, o-cresotinic acid, 1.3-dihydroxyquinoline, a pyrazolone-compound, a methyl-ketol compound etc.

The new dyestuffs dye cotton clear green shades of excellent fastness to light. They are in a dry state dark powders of grayish-green to black-green to black color, easily soluble in water with a blue-green to yellow-green color, easily soluble in concentrated sulfuric acid with olive-green color.

The following examples serve to illustrate our invention without limiting it thereto:

*Example 1.*—853 parts of the sodium salt of the disazo dyestuff of the formula (described in the U. S. Patent 1,602,991)

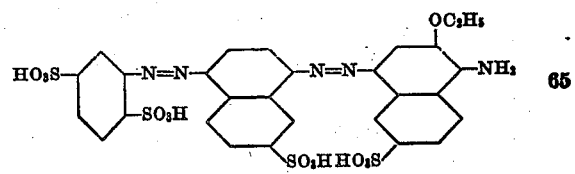

are stirred with a small amount of water to a paste. While cooling well, 280 parts by volume of caustic soda lye of 38° Bé. are added. After the dyestuff is completely dissolved, an aqueous well-cooled solution of 70 parts of sodium nitrite is slowly introduced, and then 1400 to 2000 parts by volume of well-cooled hydrochloric acid of 20% strength are added at once. The diazotation takes place quickly. After addition of common salt the diazocompound separates as a violet-brown precipitate. It is filtered off while cold and slowly introduced into a well-stirred and from outside cooled solution of 358 parts 4' aminobenzoyl-2-amino-5-hydroxy-naphthalene-7-sulfonic acid in 100 parts by volume of ice-water, a small amount of ammonia-water and 2000 parts by volume of technical pyridine. The coupling process takes place at once, while the solution becomes blue-black. The dyestuff is salted out and filtered. After being purified by recrystallizing it is dissolved in warm water, the solution is cooled to a temperature of 0 to +5° C.; an aqueous solution of 70 parts of sodium nitrite is introduced and the mixture is acidified by adding about 800 parts by volume of hydrochloric acid of 20% strength. After addition of common salt the diazotrisazo-compound separates as a black-violet precipitate of metallic lustre. It is filtered off, dissolved again and coupled at a temperature of 5 to 10° C. with a sodaalkaline solution of 233 parts of the sodium salt of methylketol sulfonic acid obtainable by treating alpha-methylindol (alpha-methylketol) with a sulfonating agent, in 300 parts by volume of water. The reaction takes place quickly. The dyestuff is salted out, filtered, pressed and dried. It is easily soluble in water and dyes cotton clear green shades of excellent fastness to light. It corresponds to the formula

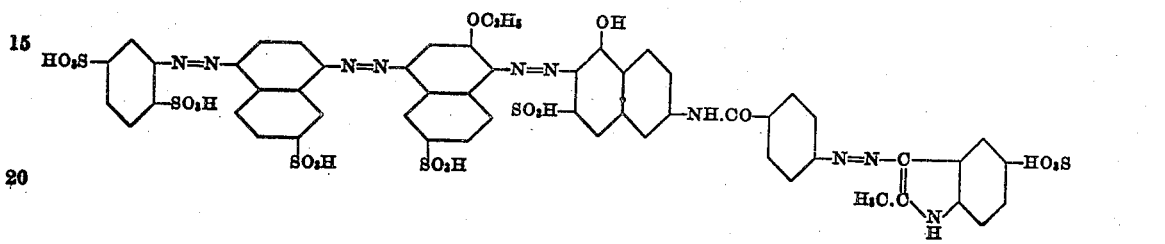

Dyestuffs of similar shades and the same properties as to fastness can be obtained by using:

1. Instead of 1-aminobenzene-2.5-disulfonic acid 2-amino-1-methoxybenzene-4-sulfonic acid, 3-chloro-1-aminobenzene-6-sulfonic acid, 1-aminobenzene-3-sulfonic acid, 1-aminobenzene-2.4-disulfonic acid, 4-nitro-1-aminobenzene-2.5-disulfonic acid, 5-sulfonic acid-2-aminobenzoic acid, aniline and its substitution products.

2. Instead of 1-aminonaphthalene-7-sulfonic acid used in the above example in the second place one can use 1-aminonaphthalene-6-sulfonic acid, a mixture of isomeric sulfonic acids or 1-aminonaphthalene.

3. In the third place one may use instead of 1-amino-2-ethoxynaphthalene-6-sulfonic acid 1-amino-2-methoxynaphthalene, 1-amino-2.7-dimethoxynaphthalene, 1-amino-2-naphthydroxy-β-propionic acid of the formula

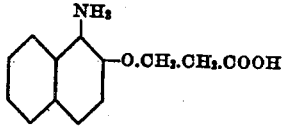

the 1-amino-2.7-naphthyleneglycolic acid of formula

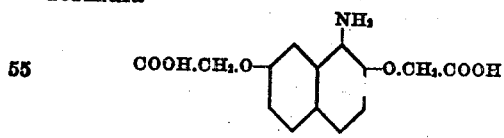

or the ω-sulfonic acid ester of 1-amino-2-hydroxy-ethoxynaphthalene of the formula:

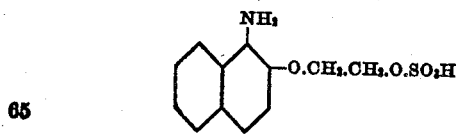

1-amino-2-naphthydroxy-β-propionic acid can be prepared by condensation of 2-hydroxynaphthalene with β-chloropropionic acid, mono-nitration of the condensation product and reduction.

The new product thus prepared represents a crystalline reddish powder forming a hydrochloric acid salt easily soluble in water.

1-amino-2.7-naphthyleneglycolic acid can be prepared by condensation of 2.7-dihydroxynaphthalene with 2 molecular proportions of mono-chloro-acetic acid, mono-nitration of this condensation product and reduction.

The substance thus obtained represents a grey-brownish crystalline powder easily soluble in sodium carbonate.

1-amino-2-hydroxy-ethoxynaphthalene can be prepared by nitration and following reduction of ω-sulfonic acid ester of the hydroxyethylether of 2-hydroxy-naphthalene described in the German Letters Patent No. 443,340.

The new product thus obtained represents an almost colourless crystalline powder easily soluble in sodium carbonate.

The dyestuffs thus obtained have clear green shades of excellent fastness to light and according to the components used possess a blue to yellow hue.

4. Instead of 4'-amino-benzoyl-2-amino-5-hydroxynaphthalene-7-sulfonic acid one can use in the fourth place other derivatives of 2-amino-5-hydroxynaphthalene-7-sulfonic acid, for instance the derivative substituted in the 1-position, which contain in heteronuclear side-chains diazotizable amino-groups, for instance 4'- (or 3'-) aminobenzoyl-2-amino-5-hydroxynaphthalene-1.7- or 3.7-disulfonic acids, or 4'-(or 3'-) aminobenzoyl-2-amino-1-chloro-5-hydroxynaphthalene-7-sulfonic acid, or 4''-aminobenzoyl-4'-aminobenzoyl-2-amino-5-hydroxynaphthalene-7-sulfonic acid, or an isomer thereof, or 3'-aminophenyl-1.2-naphthimidazole-5-hydroxy-7-sulfonic acid, or 4'- (or 3'-) aminophenyl-1.2-naphthothioazole-5-hydroxy-7-sulfonic acid, or the corresponding triazole derivatives or 3-amino-γ-(5-hydroxy-7-sulfonic acid-2-naphthyl)-benzimidazole (which can be prepared by heating 2'-4'-diaminophenyl-2-amino-5-naphthol-7-sulfonic acid with formic acid, and heating the m-formyl-amino-γ-5-hydroxy-7-sulfonic acid-2-naphthylbenzimidazol in mineral acid solution to form the free amino compound and which corresponds to the most probable formula:

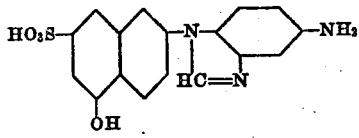

or 4'-(or 3'-)-aminophenyl-2-(5-hydroxy-7-sulfonic acid)-naphthylurea of the formula:

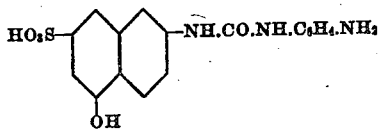

(which can be prepared by condensation of 4- or 3-nitrophenyl-ureachloride, or 4- or 3-nitrophenylisocyanate with 2-amino-5-hydroxynaphthalene-7-sulfonic acid and reducing afterwards).

5. Instead of methylketol sulfonic acid one may use in the fifth place methylketol, sulfazone (salicylic acid, o-cresotinic acid, 2.4-) corresponding to the probable formula:

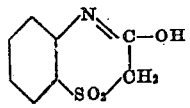

and being obtainable from o-amino-benzenesulfoacetic acid of the formula:

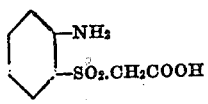

by splitting off one molecule of water.

Dihydroxyquinoline of the probable formula:

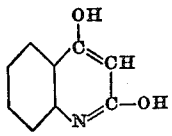

1-phenyl-3-methyl-5-pyrazolone, 1-phenyl-5-pyrazolone-3-carboxylic acid, 1-(3'-carboxyphenyl)-3-methyl-5-pyrazolone, or the isomers thereof. The dyestuffs thus obtained have according to the components blue-green to yellow-green shades of excellent fastness to light.

*Example 2.*—787 parts of the sodium salt of the dyestuff of the formula:

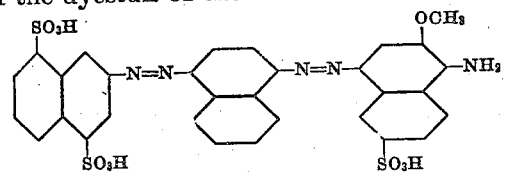

are diazotized as described in Example 1. The suspension of the diazodisazo compound thus obtained is slowly introduced to an outside well-cooled solution of 355 parts 3'-aminophenyl-1.2-naphthimidazole-5-hydroxy-7-sulfonic acid in 100 parts by volume of ice-water, 500 parts by volume of ammonia water of 20% strength and 2500 parts by volume of technical pyridine. The formation of the dyestuff starts at once. The dyestuff is purified as described in Example 1. The paste of the trisazodyestuff is dissolved in warm water, diazotized as in Example 1 and coupled with a sodaalkaline solution of 1-(4'-carboxyphenl)-3-methyl-5-pyrazolone (prepared from the hydrazine of the 4-aminobenzoic acid). The dyestuff purified in the usual manner yields on cotton clear green shades of excellent fastness to light.

Instead of the pyrazolone used in the above example in the fifth place one can use other pyrazolone derivatives, for instance 1-phenyl-3-methyl-5-pyrazolone derivatives, such as obtained from 2- or 3- aminobenzoic acid or from aniline-2-, or 3- or 4-sulfonic acid, or 1-phenyl-5-pyrazolone-3-carboxylic acid, or the dipyrazolone obtained from 4.4'-diaminodiphenyl, or the pyrazolone of dehydrothiotoluidine sulfonic acid, or the pyrazolone of 3-amino-2-hydroxy benzoic acid-5-sulfonic acid, or the pyrazolone obtained in the usual manner from the condensation product from 1 mol p-aminobenzaldehyde and 2 mol of o-cresotinic acid, corresponding most probably to the formula:

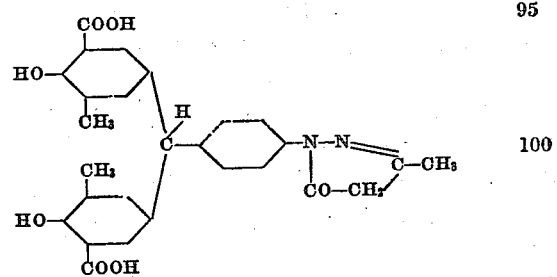

or the pyrazolone obtained from 2-amino-naphthalene-6-sulfonic acid, or the pyrazolone obtained from 2-amino-5-hydroxy naphthalene-7-sulfonic acid. The dyestuffs thus obtained have green shades of similar properties as the dyestuff described above.

*Example 3.*—765 parts of the sodium salt of the dyestuff of the formula:

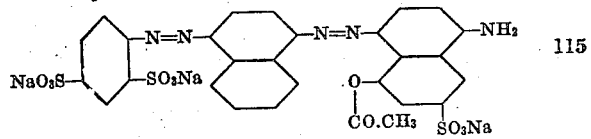

are diazotized as described in Example 1 and coupled in the presence of ammonia with a sodaalkaline solution of 358 parts of 3'-aminobenzoyl-2-amino-5-hydroxynaphthalene-7-sulfonic acid while cooling well from outside. The dyestuff thus obtained is salted out, dissolved by means of hot soda or caustic soda lye, which has to be in excess. The solution is boiled, whereby the acetyl-residue of the third component is split off. The trisazo dyestuff thus obtained is isolated, diazotized as described in the foregoing examples and coupled by slowly introducing it in a sodaalkaline solution of 221 parts of acetoaceticacid anilide-4-carboxylic acid The dyestuff thus obtained has similar properties as the dyestuffs described above.

Instead of 1-amino-5-acetohydroxynaphthalene-7-sulfonic acid used in this example in the third place one can employ with a similar success the following compounds which couple in para-position to the amino group: 1-amino-5-hydroxynaphthalene, 1-amino-5-hydroxynaphthalene-6-sulfonic acid, 1-amino-8-hydroxynaphthalene-6-sulfonic acid, or the o-acetyl derivatives thereof.

Instead of acetoaceticacid anilide-4-carboxylic acid used in the above example in the fifth place one can use acetoaceticacid anilide, acetoaceticacid-2-toluidide, acetoaceticacid-2-chloroanilide, acetoaceticacid-4-anisidide, acetoaceticacid-5-nitro-4-chloro-2-anisidide of the probable formula:

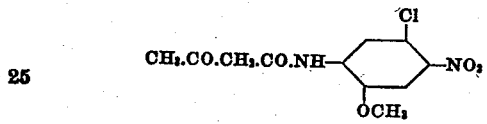

di-(acetoacetyl)-tolidide of the most probable formula:

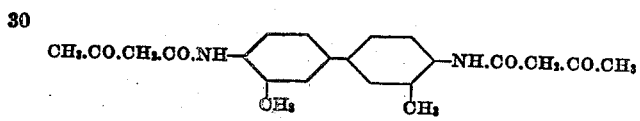

benzoylaceticacid anilide, etc., or other derivatives of the β-ketoaldehydes, for instance 1.3-diketohydrindene of the formula:

The dyestuffs thus obtained yield clear green shades of excellent fastness to light.

We wish it to be understood that we claim in this application only the compounds of the general formula given at the beginning of the specification, whereas the compounds of the general formula:

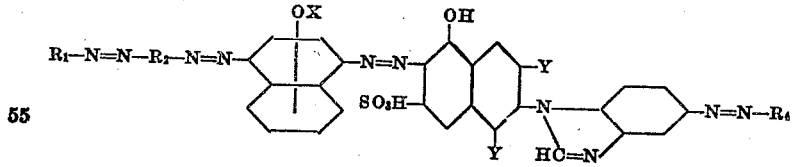

wherein $R_1$ represents an aromatic residue, $R_2$ a residue of the naphthalene series, $R_4$ the residue of a suitable end component, X hydrogen, an alkyl or acidyl group, and Y hydrogen or any monovalent substituent will be claimed in a copending application.

The formulas of the dyestuffs described and claimed herein will be readily apparent from the following table in which the various components of our dyestuffs are listed:

| | First component | First middle component | Second middle component | Third middle component | Final component |
|---|---|---|---|---|---|
| (1) | 1-amino-benzene-2.5-disulfonic acid | 1-amino-naphthalene-7-sulfonic acid | 1-amino-2-ethoxy-6-sulfonic acid | 4'-aminobenzoyl-2-amino-5-hydroxy-naphtha-lene-7-sulfonic acid | methyl-ketol-sulfonic acid |
| (2) | 2-amino-1-methoxy-benzene-4-sulfonic acid | 1-amino-naphthalene-6-sulfonic acid | 1-amino-2-methoxy-naphthalene | 4'-aminobenzoyl-2-amino-5-hydroxy-naphthalene-7-sulfonic acid | methyl-ketol-sulfonic acid |
| (3) | 3-chlor-1-amino-benzene-6-sulfonic acid | mixture of the isomeric 6- and 7-sulfonic acids of 1-amino-naphthalene | 1-amino-2.7-dimethoxy-naphthalene | 4'-aminobenzoyl-2-amino-5-hydroxy-naphthlene-7-sulfonic acid | methyl-ketol-sulfonic acid |
| (4) | 1-amino-benzene-3-sulfonic acid | 1-amino-naphthalene-7-sulfonic acid | 1-amino-2-naphthy-droxy-propionic acid | 3'-amino-benzoyl-2-amino-5-hydroxynaphthalene-7-sulfonic acid | methyl ketol |
| (5) | 1-amino-benzene-2-4-disulfonic acid | 1-amino-naphthalene | 1-amino-2.7-naphthylene-glycollic acid | 3'-amino-benzoyl-2-amino-1-chloro-5-hydroxynaphthalene-7-sulfonic acid | sulfazone |
| (6) | 4-nitro-1-amino-benzene-2-5-disulfonic acid | 1-amino-naphthalene | ω-sulfonic ester of 1-amino-2-hydroxy-ethoxy-naphthalene | 4''-amino-benzoyl-4'-amino-benzoyl-2-amino-5-hydroxy-naphthalene-7-sulfonic acid | salicylic acid |
| (7) | 2-naphthylamine-5-7-disulfonic acid | 1-amino-naphthalene-6-sulfonic acid | 1-amino-2-ethoxy naphthalene-6-sulfonic acid | 4'-amino-benzoyl-2-amino-5-hydroxy naphthalene-7-sulfonic acid | pyrazolone of the condensation product of 1 mol of para-amino-benzaldehyde and two mols of orthocresotinic acid |
| (8) | 2-naphthylamine-5-7-disulfonic acid | 1-amino-naphthalene-6-sulfonic acid | 1-amino-2-ethoxy naphthalene-6-sulfonic acid | 4'-amino-benzoyl-2-amino-5-hydroxy naphthalene-7-sulfonic acid | pyrazolone of 2-amino-naphthalene-6-sulfonic acid |
| (9) | 2-naphthylamine-5-7-disulfonic acid | 1-amino-naphthalene-6-sulfonic acid | 1-amino-2-ethoxy naphthalene-6-sulfonic acid | 4'-amino-benzoyl-2-amino-5-hydroxy naphthalene-7-sulfonic acid | pyrazolone of 2-amino-5-hydroxy-naphthalene-7-sulfonic acid |
| (10) | 1-amino-benzene-2.4-disulfonic acid | 1-amino-naphthalene | 1-amino-5-acet-hydroxy-naphthalene-7-sulfonic acid | 3'-amino-benzoyl-2-amino-5-hydroxy-naphthalene-7-sulfonic acid | aceto acetic acid-anilide 4-carboxylic acid |
| (11) | aniline-2.3.6-trisulfonic acid | 1-amino-naphthalene | 1-amino-5-acet-hydroxy-naphthalene | 3'-amino-benzoyl-2-amino-5-hydroxy-naphthalene-7-sulfonic acid | aceto acetic acid-anilide 4-carboxylic acid |
| (12) | aminobenzene-2.4-disulfonic acid | 1-amino-naphthalene | 1-amino-8-acethydroxy-naphthalene-6-sulfonic acid | 3'-amino-benzoyl-2-amino-5-hydroxy-naphthalene-7-sulfonic acid | aceto acetic acid-anilide 4-carboxylic acid |
| (13) | aminobenzene-2.4-disulfonic acid | 1-amino-naphthalene | 1-amino-8-acethydroxy-naphthalene-6-sulfonic acid | 3'-amino-benzoyl-2-amino-5-hydroxy-naphthalene-7-sulfonic acid | 1.3-diketohydrindene |

We claim:

1. As new products the azo dyestuffs of the general formula:

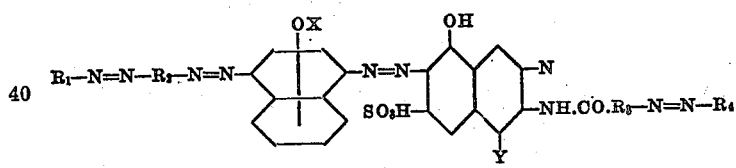

wherein $R_1$ and $R_3$ represent aromatic residues, $R_2$ represents a residue of the naphthalene series, $R_4$ a residue of any suitable end component, X hydrogen, an alkyl or acidyl group, and Y hydrogen or any monovalent substituent being in a dry state dark powders of grayish-green to black-green, to black color, easily soluble in water with a blue-green to yellow-green color, and in concentrated sulfuric acid with olive-green color, dyeing cotton clear green shades of excellent fastness to light.

2. As new products the azo dyestuffs having probably the formula:

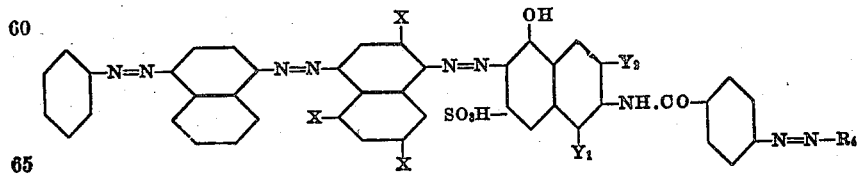

wherein at least one X represents a substituent of the group including hydroxyl, alkoxyl, or acyloxy, the other X's represent hydrogen or any other substituent, $Y_1$ and $Y_2$ represent hydrogen or a monovalent residue, and $R_4$ the residue of any suitable end component, being in a dry state dark powders of grayish-green to black-green to black color, easily soluble in water with a blue-green to yellow-green color, and in concentrated sulfuric acid with olive-green color, dyeing cotton clear green shades of excellent fastness to light.

3. As new products the azo dyestuffs having probably the formula:

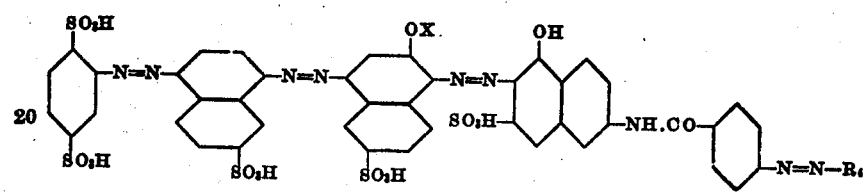

wherein X stands for an alkyl group and $R_4$ stands for a methyl-ketol compound, which are in a dry state dark powders of grayish-green to black-green to black color, easily soluble in water with a blue-green to yellow-green color, and in concentrated sulfuric acid with olive-green color, dyeing cotton clear green shades of excellent fastness to light.

4. As a new product the azo dyestuff having probably the formula:

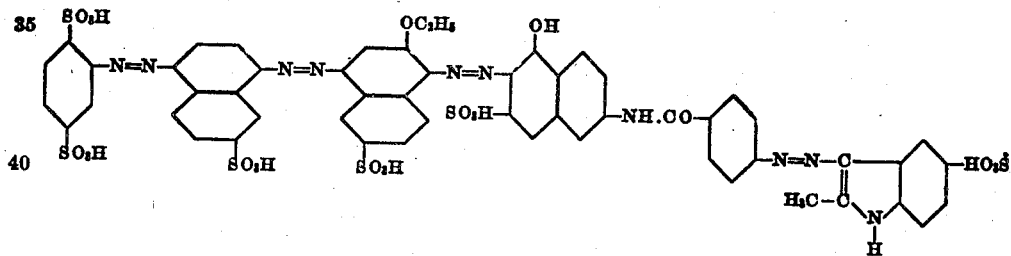

which is in a dry state a dark powder easily soluble in water dyeing cotton clear green shades of excellent fastness to light.

In testimony whereof we have hereunto set our hands.

WINFRID HENTRICH.
MAX HARDTMANN.